Figure 5:
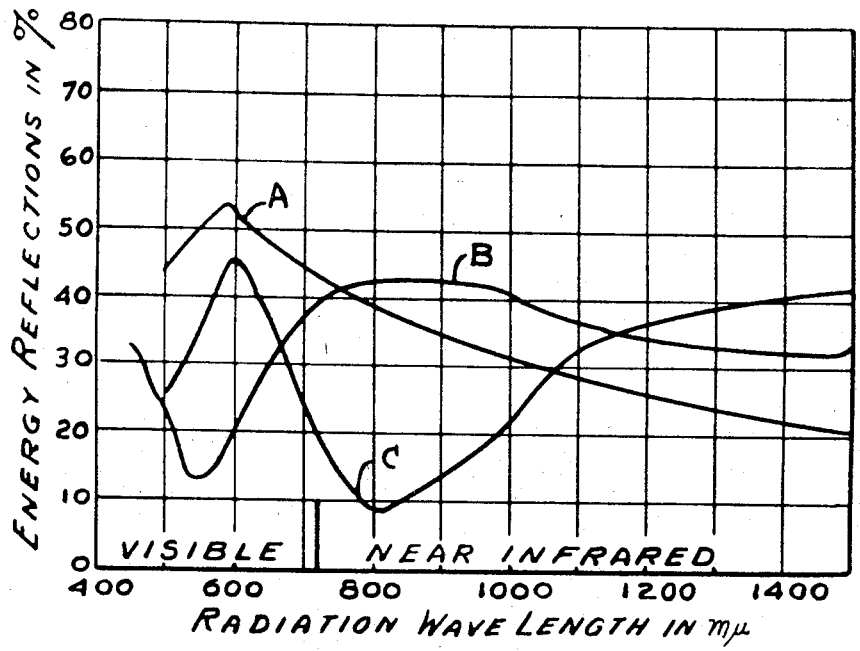

Nov. 12, 1968
J. M. MOCHEL
3,410,710
RADIATION FILTERS
Original Filed Oct. 16, 1959
2 Sheets-Sheet 1
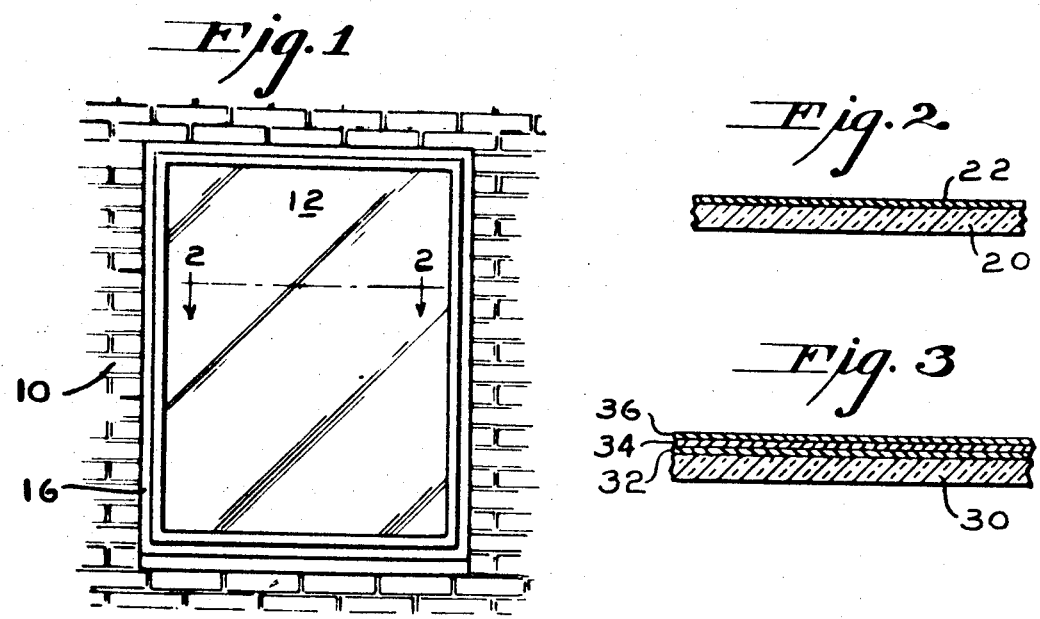
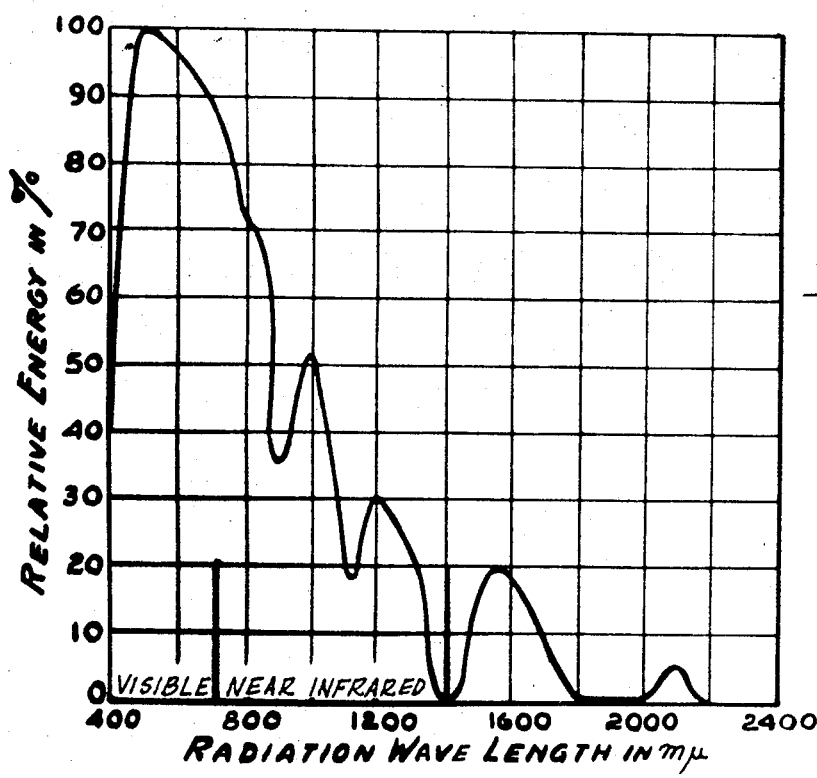
INVENTOR.
John M. Mochel
BY Milton Peterson
ATTORNEY

3,410,710
RADIATION FILTERS

John M. Mochel, Painted Post, N.Y., assignor to Corning Glass Works, Corning, N.Y., a corporation of New York
Original application Oct. 16, 1959, Ser. No. 846,896, now Patent No. 3,202,054, dated Aug. 24, 1965. Divided and this application Dec. 1, 1964, Ser. No. 422,878
7 Claims. (Cl. 117—33.3)

This application is a divisional application based on Ser. No. 846,896, filed Oct. 16, 1959, now U.S. Patent 3,202,054.

This invention relates to radiation or optical filters particularly adapted to solar radiation control and to a method of producing such filters. It is particularly concerned with a filter utilizing an iridized metal oxide film as the filter means.

The recent architectural trend in the direction of glass as a structural material has intensified the search for improved means of producing and controlling color effects in structural glass. Larger architectural and vehicular glass closures have also rendered more critical the well recognized need for an effective and economical means of minimizing thermal effects created by solar radiation. Thus, a practical solar radiation filter could greatly reduce the present need for air conditioning and cooling. The problem of meeting such needs is complicated by the degree of visible light transmission required in some types of closures, e.g. vehicle windows, being greater than that desired or even tolerable for other purposes.

Special heat absorbing glasses have been proposed as a means of achieving solar energy control in architectural and vehicular closures. Such glasses are relatively inefficient for the purpose because much of the heat which they absorb ultimately is transferred to interior areas either by conduction and convection currents or by secondary radiation from the glass. Also, the effective ingredients in these glasses, minor amounts of colorant oxides, render them generally difficult and expensive to melt homogeneously and reproducibly. This is particularly true in large glass melting units from which sheet glass is ordinarily produced.

It has also been proposed to employ various types of thermally evaporated films. Such films are potentially much more effective since they operate on the principal of reflection rather than absorption of the heat producing radiation. However, except for small items such as optical lenses and the like, it is generally impractical and too expensive to produce such films. This is particularly true in connection with large glass sheets or plate such as are used in producing vehicle or building closures.

It is a primary purpose of this invention to provide an improved radiation filter adapted to meet the need set forth above. A further purpose is to provide radiation filters adapted to control transmission in the visible and/or infrared portions of the spectrum. A further purpose is to provide an improved method of producing large radiation filters having superior clarity, uniformity and color adaptability. Another purpose is to provide a practical and flexible method of producing such filters.

A radiation filter in accordance with this invention comprises a refractory substrate and an iridized metal oxide film having a reflectance peak of at least 25% in the near infrared radiation spectrum, the film being composed of at least one oxide of the group of metals having atomic numbers from 22–29 inclusive. For maximum infrared reflectance the film preferably consists of iron or cobalt oxide.

Where maximum transmission of radiation in the visible portion of the spectrum is desired, a clear transparent glass substrate, e.g. a conventional silicate glass, will ordinarily be employed. Where visible transmission is not a factor, a colored glass or other known refractory substrate material may be employed.

An iridized film is formed by thermal or thermo-chemical decomposition of a metal compound at or on a heated substrate surface to form a thin adherent metal oxide film on such surface. The film may alternatively be formed by pyrolysis of a compound such as an organometal compound or by hydrolysis of a metal compound such as a metal chloride and subsequent pyrolysis or thermal dehydration of such hydrolized salt. Generally, the compound to be decomposed is applied to the substrate surface in the form of a vapor or atomized solution, although it is also known to apply a metal compound on a cold substrate and heat the coated substrate to produce the desired decomposition.

Figure 6:
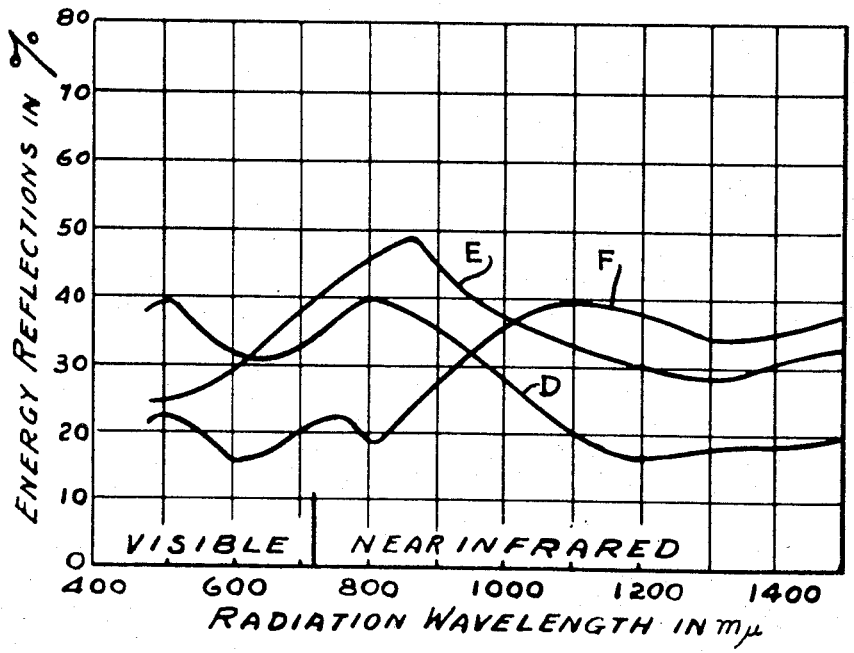

The invention is more fully described with reference to the accompanying drawings in which;

FIG. 1 is a front elevation of a glazing unit illustrating a typical embodiment of the invention, FIG. 2 is a sectional view along line 2—2 of FIG. 1, FIG. 3 is a sectional view illustrating a modified form of the invention, FIG. 4 is a graphical illustration of the relative energy in solar radiation as a function of wave length, FIG. 5 is a graphical illustration of the reflectivity of iridized iron oxide films as a function of film thickness and wave length, and FIG. 6 is a corresponding graphical illustration for cobalt oxide iridized films.

In FIG. 1, exterior building wall 10 includes a window, generally designated 12, comprising a single sheet of iridized glass mounted in a frame 16 and affixed in wall 10 in any conventional manner. As shown in FIG. 2, iridized window 12 is composed of a conventional sheet of transparent glass 20 and a thin adherent film of a metal oxide 22 formed on the outer or exterior surface of the sheet as installed in wall 10. FIG. 3 illustrates a modified type of radiation filter which may for example include a sheet of glass 30 corresponding identically with glass sheet 20 of FIG. 2. Glass sheet 30 has a plurality of iridized metal oxide films 32–36 formed on its surface in superimposed relationship. The arrangement and nature of these superimposed films will be discussed subsequently.

The relative thermal effects resulting from solar radiation are particularly well illustrated in the graphical illustration of FIG. 4 taken from an article by Moon in the Journal of the Franklin Institute, vol. 230, p. 553 (1940). In this illustration, the relative amounts of thermal energy resulting from different wave lengths of solar radiation are shown in terms of percentage. The largest thermal effect, at a given wave length, occurs in the range of visible radiation, that is in the visible portion of the spectrum from about 400 to 700 millimicrons. However, the overall thermal energy contribution from radiations in the so-called near infrared region, that is from about 700 to 1400 millimicrons, approximates that from the visible region. In contrast, radiations beyond 1400 millimicrons, that is in the far infrared, produce a comparatively minor thermal effect. This suggests that maximum benefits from a thermal standpoint, can be achieved by controlling radiation either in the visible or in the near infrared regions. For many purposes however, particularly in architectural and vehicular closures, the amount of radiation dissipation that may be tolerated in the former region is limited by visual requirements. Thus, it has been proposed that for architectural closures visual transmission on the order of at least 30% of normal is desirable. Vehicle closures will normally have a considerably higher requirement, whereas in decorative structural glass visible transmission may be immaterial.

The present invention is based in part on my discovery that filters, capable of providing a peak reflectance of at least 25% in the near infrared, can be provided by pyrolyzing compounds of the metals titanium, vanadium, chromium, manganese, iron, cobalt, nickel and copper, either singly or in combination, to form iridized films of the corresponding metal oxides on neutral or transparent glass substrates. In particular, cobalt and iron oxide films may have an unusually large reflectivity in the near infrared region which is a complex function of their reflectance characteristics and the thickness of the iridized film.

Metal oxide films in accordance with the invention are colored films having a varying degree of absorption for radiations in the visible portion of the spectrum depending on film composition and thickness. As pointed out earlier with reference to heat absorbing glasses, absorption has been recognized as a much less effective means of thermal control. I have found however, that the same considerations apply to a much lesser degree where, as in the present filters, absorption occurs in a film on the external surface of a glass substrate rather than in the substrate itself. Accordingly, the present colored films are not only advantageous because of their reflectance characteristics but also are much more effective as radiation absorbing media as well.

The effect of film thickness is illustrated in FIGS. 5 and 6 which respectively show the reflectance characteristics of iron and cobalt oxide films in three different optical thicknesses. Each graphical illustration depicts reflectance in terms of percent at different radiation wave lengths. In FIG. 5 curves A, B and C show the reflectance of iridized iron oxide films which are respectively 1500, 2300 and 5,000 Angstrom units thick in terms of optical thickness. Correspondingly, curves D, E and F of FIG. 6 show the reflectance characteristics of iridized cobalt oxide films having optical thicknesses of 1,000, 2,000 and 3,500 Angstrom units. As is well known, optical thickness represents absolute thickness divided by the film refractive index. Hence absolute thickness is on the order of two to three times the indicated optical thickness. It will be observed that with each type of film, an optimum reflectance in the near infrared region and an optimum or relatively high transmission in the visible region is obtained with a film having an optical thickness of about 2,000–2,500 Angstrom units. The reflectance peak, i.e. the point of highest reflectivity, for this film thickness occurs at a wavelength of about 900 millimicrons and approaches 50%.

Where a relatively low degree of visible transmission is either desirable or may be tolerated, a considerably higher reflectivity in the near infrared as well as the visible region can be obtained with a multiple film arrangement such as shown in FIG. 3. In such an arrangement alternate film layers 32 and 36 are composed of a relatively high index, reflecting oxide, e.g. either cobalt or iron oxide, for reflectance purposes. These reflecting films are separated by a clear colorless iridized metal oxide film 34 having a low refractive index. For this purpose iridized amorphous silica or alumina films of approximately the same optical thickness as the cobalt or iron oxide reflecting films, and having a refractive index approximating the 1.5 value of ordinary lime glass, are particularly suitable.

A multilayer film of this nature is particularly effective since it provides a maximum amount of infrared radiation reflectance with a minimum absorption effect on visible radiations. Thus the absorption in three spaced reflecting films of about 2000 A. units thickness each will be approximately that of a single 6000 A. reflecting film. However, reflectance remains essentially unchanged regardless of single film thickness since reflectance, unlike absorption, is a function of film interfaces. While secondary reflections cause some interference, the total reflection from a multilayer film is approximately a function of the number of interfaces or spaced reflecting films. Thus, we may assume 40% reflection and 60% transmission of near infrared at the initial interface in FIG. 3, i.e. the 34–36 interface. Then, of the 60% transmitted radiations, another 40% reflection occurs at the glass-film interface 30–32 this being 24% of the original infrared radiations reaching the filter. Total reflection then will be 64%. It will be apparent that a third reflection, as would occur in a five layer film, would be about 13% and would provide an overall reflection of about 77% of the original infrared radiation.

The extent to which the reflecting films and spacer films may be multiplied is relatively unlimited. However, optical quality usually diminishes and visible transmission decreases as a function of increasing thickness. Consequently, a five layer film, that is three reflecting films and two spacing films, is usually the maximum feasible, the overall illumination level with such a multilayer cobalt or iron oxide filter being about 25% of normal unfilmed glass.

If the thickness of all the layers in a multilayer film are precisely the same, the reflection peak will be narrow and high; if there is some variation in thickness, the reflection peak will be broader and not quite as high. The latter situation usually occurs even when close control is exercised over the relatively non-precise pyrolysis method of forming films. This broadening is desirable since a generally high reflection band extending from approximately 650 millimicrons to about 1300 or 1400 millimicrons may be produced in this manner. However thickness variations greater than ±10%, are generally detrimental and should be avoided.

Various iridizing processes are known and various metal compounds may be successfully employed. However, for present purposes I have found that the use of metal derivatives of the 1,3-beta diketonates, preferably the acetyl acetonates, either in vaporized or atomized solution form, provide a distinctly superior iridizing atmosphere. In producing optical filters of any nature, uniformity is highly desirable. In iridizing, particularly where large surfaces are involved, it is difficult to achieve this uniformity of film thickness. One cause is uneven cooling of the substrate and avoidance of a water solution minimizes this effect. Even as compared to other organic solutions however, the diketonates generally provide a much more uniform iridized film. The reason for this is not entirely understood but is believed to be associated with compound stability whereby the atmosphere spreads uniformly over the surface before decomposition by pyrolysis occurs.

It is also found that haziness, particularly on soda lime type glass is minimized by using this type of metal compound. The acetyl acetonates of all of the metals are readily volatilized or atomized in organic solution, thus facilitating iridizing. Furthermore, the acetyl acetonates of these metals are mutually compatible, thus permitting mixtures to be applied for modified color effects.

It will be understood that the metal diketonate may be prepared and used as such or another compatible metal salt may be mixed with the diketone compound, the latter also effectively stabilizing the iridizing solution as explained earlier. Acetyl acetone is a commercial synonym for the chemical term 2,4-pentane dione.

I have further found that iridized films of the metal oxides enumerated above provide a variety of reflected light colors for architectural glass decorative purposes. Also, as shown below, the oxides may be employed in combination to provide an even greater range of color effects. This obviates prior difficulties in reproducibly melting colored glasses and providing desired color variations. With this invention conventional sheet glass can be drawn or rolled continuously and a range of color filter and uncolored glass products may be produced merely by employing selected iridizing materials as required. This permits melting of a single, uncolored glass for all purposes.

By way of further illustrating the invention and its practice, the following specific examples are presented:

EXAMPLE 1

An iridizing solution was compounded by dissolving ferric acetyl acetonate in methanol in the ratio of:

| | |
|---|---|
| Ferric acetyl acetonate _____grams__ | 10 |
| Methanol _____cc__ | 100 |

A plate of clear borosilicate glass was heated to a temperature of 625° C. in a furnace and quickly moved under a conventional spray gun for application of the solution as an atomized spray. Exposure was of such duration as to provide an iron oxide film having an optical thickness of about 2000 A. on a plate surface of about 10 square inches. The filmed plate had reflectance characteristics as shown by Curve B in FIG. 5, and a golden brown visual appearance by reflected light.

The thickness may be visually gauged by comparison with a reference standard measured spectrophotometrically. Such standard will have a thickness between 1st order red and 2nd order blue as measured by the well known principle of interference colors. Since this is not sharply distinctive, one may also base thickness on the basis of applying 6.5 cc. of solution to an area of about 10 sq. in. in a period of about seven seconds at the indicated temperature.

EXAMPLE 2

A glass plate filmed with an iron oxide in accordance with Example 1, was reheated to 625° C. and exposed at such temperature to an atomized atmosphere of an aluminum compound solution composed of the following materials in the indicated proportions, the aluminum being at least partially in the form of aluminum acetyl acetonate:

| | |
|---|---|
| $Al(NO_3)_3 \cdot 9H_2O$ _____grams__ | 10 |
| Acetyl acetone _____cc__ | 10 |
| Methanol _____cc__ | 5 |

The exposure time was such as to produce a film corresponding approximately in thickness to that of the iron film. The same amount of solution 6.5 cc., was employed to produce the desired thickness. The resulting film is composed of an amorphous form of alumina, is visually colorless and has a refractive index of approximately 1.5.

Thereafter the filmed glass plate was reheated to 625° C. and a second iron oxide film corresponding to that described in Example 1 produced by repeating the procedure described there.

EXAMPLE 3

Alternatively, an iridized alumina film, as described in Example 2, may be produced from the following solution:

| | |
|---|---|
| Aluminum acetyl acetonate _____grams__ | 10 |
| Benzene _____cc__ | 100 |

A ten square inch film having an optical thickness of about 2000 A. is produced by application of about 5 cc. of solution. However, the substrate must be heated to about 675° C. and the solution of Example 2 is preferred because of the lower temperature. It is thought the nitrate may accelerate oxidation and $Al_2O_3$ formation from the diketonate complex at the lower temperature.

In producing aluminum acetyl acetonate, a solution of 20 grams aluminum nitrate in 50 cc. $H_2O$ is stirred rapidly into a solution of 6 cc. 28% ammonium hydroxide, 16 cc. acetyl acetone and 75 cc. $H_2O$. The precipitate of aluminum acetyl acetonate is thoroughly washed and dried for use.

A multilayer film, formed in the described manner and embodying three iron oxide films and two alumina films, was found to provide a reflectance peak of about 80% as compared to a peak of about 40% for the initial single layer of iron oxide.

EXAMPLE 4

The procedure described in Example 1 was repeated except that the following iridizing solution was employed:

| | |
|---|---|
| Cobalt acetyl acetonate _____grams__ | 10 |
| Methanol _____cc__ | 100 |
| Pyridine _____cc__ | 10 |

The resulting filmed glass, having a thickness of about 2000 A., had a light greenish brown appearance by reflected light, and had a reflectance curve corresponding to that shown as Curve E, FIG. 5.

A multilayer film filter was produced in a manner corresponding to that described in Example 2 and had similar reflectance characteristics in the near infrared.

EXAMPLE 5

A chromium oxide film having an optical thickness of about 1700 A. was formed by spraying about 5 cc. of the following solution on a 10 sq. in. section of sheet glass heated to a temperature of 625° C.:

| | |
|---|---|
| Chromium acetyl acetonate _____grams__ | 10 |
| Methanol _____cc__ | 40 |
| Benzene _____cc__ | 20 |

EXAMPLE 6

A nickel oxide film was produced by spraying the following solution on glass at 675° C.:

| | |
|---|---|
| Nickel acetyl acetonate _____grams__ | 10 |
| Benzene _____cc__ | 30 |
| Methanol _____cc__ | 10 |
| Pyridine _____cc__ | 5 |

EXAMPLES 7–10

The following solutions were employed in like manner to produce the corresponding metal oxide films:

| | |
|---|---|
| Vanadium acetyl acetonate _____grams__ | 2 |
| Methanol _____cc__ | 10 |
| Pyridine _____cc__ | 1 |
| Copper acetyl acetonate _____grams__ | 10 |
| Methanol _____cc__ | 100 |
| Diethylene triamine _____cc__ | 10 |
| Manganese acetyl acetonate _____grams__ | 20 |
| Methanol _____cc__ | 50 |
| Pyridine _____cc__ | 5 |
| Titanium tetra isopropoxide _____cc__ | 30 |
| Benzene _____cc__ | 100 |
| Acetyl acetone _____cc__ | 40 |

Colors produced with the various oxides are:

| | |
|---|---|
| $CuO$ | Reddish brown. |
| $NiO$ | Light green. |
| $CoO$ | Dark brown. |
| $Fe_2O_3$ | Amber to deep red. |
| $MnO$ | Brown. |
| $Cr_2O_3$ | Green. |
| $V_2O_5$ | Dark brown. |
| $TiO_2$ | Colorless to blue. |

The depth of color is dependent on film thickness in large degree.

EXAMPLE 11

A mixture in about equal parts of the chromium solution of Example 5 and the cobalt solution of Example 4 was sprayed on a glass surface at 625° C. The resulting film was a neutral gray color which provided substantially uniform light transmission across the visible portion of the spectrum.

EXAMPLE 12

A neutral gray film similar to that of Example 11 was produced from a mixture of the chromium solution with the nickel solution of Example 6 in equal parts. Substantial predominance of either solution in the mixture of Examples 11 or 12 produce films tending toward the color characteristics of the corresponding predominant metal oxide.

EXAMPLE 13

The copper and manganese solutions of Examples 8 and 9 were mixed in ratios varying from 20 to 80% of each solution. The films resulting from spraying the mixed solutions produced a neutral density type film having a bluish tint. Thus, a film of about 2000 A. optical thickness provided a substantially straight transmission line across the visible region varying from 50% transmission at the blue end to about 40% transmission at the red end.

EXAMPLE 14

A neutral gray film was also produced from a mixture of the cobalt and manganese solutions of Examples 4 and 9.

What is claimed is:

1. A method of producing a radiation filter which comprises heating a refractory substrate to a temperature of 500°–800° C., exposing the heated substrate to an atmosphere containing a 1,3-beta diketonate of at least one metal having an atomic number from 22 to 29 whereby said metal diketonate is pyrolyzed to form an adherent clear metal oxide film of uniform thickness on the substrate surface.

2. A method in accordance with claim 1 in which the diketonate is an acetyl acetonate.

3. A method in accordance with claim 2 in which, after the filming step there recited, the filmed substrate is exposed to an atmosphere containing an acetyl acetonate of aluminum and thereafter exposed to an atmosphere as defined in claim 2, the substrate being maintained at a temperature of 500°–800° C. and a film of the corresponding metal oxide thereby being deposited during each such exposure.

4. A method of producing an aluminum oxide film on a refractory substrate which comprises maintaining the substrate at a temperature within the range of 500°–800° C. and exposing the hot substrate to an atmosphere containing a 1,3-beta diketonate derivative of aluminum.

5. An improved method of producing colored, heat reflecting, structural glass which comprises forming a continuous flat sheet of glass, maintaining such sheet at a temperature within a range of 500°–800° C. While exposing a surface thereof to an iridizing atmosphere containing a 1,3-beta diketonate of at least one metal having an atomic number from 22–29 to form on such surface an adherent film of the corresponding metal oxide.

6. A method in accordance with claim 5 wherein the surface of the glass sheet is exposed to the iridizing atmosphere for a time sufficient to produce a metal oxide film having an optical thickness of about 2000–2500 A.

7. The method of forming adherent metal oxide films on non-porous refractory substrates which comprises the steps of: preparing a solution consisting of an organic solvent and at least a plurality of different metal acetylacetones wherein the metals are selected from a group consisting of chromium, manganese, iron, cobalt, nickel, and copper; heating the substrate to a temperature greater than about 500° C. but less than the melting and sublimation temperatures of the substrate and oxides of the metals, whichever occurs first; atomizing the solution; and directing the atomized solution against the heated substrate in air so long as the substrate surface remains hotter than a temperature greater than about 500° C. to yield a structure on the substrate surface which contains only oxides of the metal acetylacetones, and repeating the last mentioned step as many times as necessary to attain a film corresponding to a predetermined thickness.

References Cited

UNITED STATES PATENTS

| | | | |
|---|---|---|---|
| 2,430,520 | 11/1947 | Marboe | 117—107.2 |
| 2,628,927 | 2/1953 | Colbert et al. | 117—33.3 |
| 2,734,874 | 1/1956 | Drake | 117—106 |
| 2,564,708 | 8/1951 | Mochel | 117—33.3 |
| 2,692,836 | 10/1954 | McAuley | 117—54 |
| 2,698,812 | 1/1955 | Schladitz | 117—107.2 |
| 2,833,676 | 5/1958 | Heibel et al. | 117—107.2 |
| 2,831,780 | 4/1958 | Deyrup | 117—106 |
| 3,081,200 | 3/1963 | Tompkins | 117—106 |

ALFRED L. LEAVITT, *Primary Examiner.*

A. G. GOLIAN, *Assistant Examiner.*